United States Patent [19]

Sgourakes et al.

[11] 4,380,935

[45] Apr. 26, 1983

[54] EXTERNAL SENSING VORTEX FLOWMETER

[75] Inventors: George E. Sgourakes, Millis, Mass.; Paul J. Lefebvre, Little Compton, R.I.

[73] Assignee: The Foxboro Company, Foxboro, Mass.

[21] Appl. No.: 236,416

[22] Filed: Feb. 20, 1981

[51] Int. Cl.³ .............................................. G01F 1/32
[52] U.S. Cl. .................................................. 73/861.24
[58] Field of Search ............ 73/861.21, 861.22, 861.24

[56] References Cited

U.S. PATENT DOCUMENTS

| | | |
|---|---|---|
| 3,116,639 | 1/1964 | Bird . |
| 3,927,566 | 12/1975 | Zanker ............................ 73/861.24 |
| 3,946,608 | 3/1976 | Herzl . |
| 4,033,189 | 7/1977 | Herzl et al. . |
| 4,181,020 | 1/1980 | Herzl . |
| 4,329,880 | 5/1982 | Herzl .............................. 73/861.24 |

FOREIGN PATENT DOCUMENTS

| | | |
|---|---|---|
| 2842556 | 4/1980 | Fed. Rep. of Germany ... 73/861.24 |
| 823684 | 11/1959 | United Kingdom . |

Primary Examiner—Herbert Goldstein
Attorney, Agent, or Firm—Ronald J. Paglierani

[57] ABSTRACT

A vortex-sensing fluid flowmeter has a freely rotatable vortex-shedding body suspended in a section of conduit through which a fluid stream passes, the body being oriented generally transverse to the direction of fluid flow. The body has an integrally formed upstream-facing portion adapted to shed a series of vortices within the fluid, which vortices alternately influence opposite lateral faces of the body, tending to produce a periodic rotation of the body about a firmly attached rotational shaft. The shaft is rotatably mounted to the conduit and passes at one end through the wall of the conduit to the exterior thereof. A sleeve-like tube surrounds the shaft and is fastened tightly at its bottom end to the shaft and at its top end to the conduit wall to provide a fluid-tight seal around the shaft. The tube is sufficiently flexible and pliable to exert negligible restraining force against the rotation of the shaft. A sensing device located outside of the fluid stream and coupled to the externally protruding portion of the shaft exerts a predetermined restraint on the shaft. This restraint limits the maximum rotation of the shaft at high flow rates, for minimizing the fatiguing stress exerted on the sealing tube, yet does not impede rotation at low flow rates. The sensing device responds to the restrained rotations of the shaft, and electronic circuitry associated with the sensing device converts the response to a signal output indicative of the flow rate of the fluid.

18 Claims, 8 Drawing Figures

EXTERNAL SENSING VORTEX FLOWMETER

BACKGROUND OF THE INVENTION

The present invention relates generally to the field of fluid flowmeters which respond to the influences of vortices generated within the fluid stream and more particularly to flowmeters of this type in which the sensing of the responses to the vortex action is performed away from the fluid stream.

It is well known in the art of fluid flowmeter design that a non-streamlined, or bluff, body placed appropriately within a fluid stream sheds a series of periodic vortices, commonly known as a Von Karmann vortex street, alternately from opposite sides of the body, the rate of generation being related to the flow rate of the fluid. Numerous flowmeter apparatus have been devised in which a sensing element, located downstream from the bluff body, interacts in some manner with the vortices as the vortices, propagating with the fluid, move past the element. For example, the sensing element, if positioned properly, will be subject to periodic pressure pulses, induced by the vortices alternately on opposite sides of the element. Commonly used sensing elements are able to convert these alternating pressure pulses to, for example, an electrical signal which is processed and interpreted electronically to yield an accurate representation of the flow rate of the fluid.

There are several drawbacks, however, to placing the sensing element directly in the fluid stream. First of all, exposure to the process fluid, which may be highly abrasive or corrosive or at extremes of temperature, causes deterioration of the sensor and shortens its operating lifetime. Even if the sensor is not destroyed totally by the process fluids, it is very likely that the accuracy of its measurements will be affected adversely as it slowly deteriorates. Second, replacement of a effective sensing element is extremely difficult since this generally necessitates disruption in the flow of the process fluid and disassembly of the pipe section in which the sensor is located, resulting in costly downtime. With this in mind, it is particularly advantageous to position the sensing element outside of the pipe section and away from the destructive effects of the process fluid, in a more environmentally acceptable location. In such an arrangement, it becomes necessary to transmit the mechanical effects induced by the vortices, such as vibration or rotary motion, from the inside of the pipe to the location of the sensor.

Several systems for external transmission of the vortex-induced motion have been proposed in the prior art. Non-mechanical systems utilizing, for example, magnetic coupling, ultrasonic or radioactive techniques have been developed, with varying degrees of success. A commonly used means of transmission is a system in which vibrations or pulsations are induced within a body positioned within the vortex street, and are transmitted, by a mechanical linkage coupled to the body, to the exterior of the pipe. The sensor then interacts with the mechanical linkage to generate an output signal corresponding to the flow rate of the fluid. The mechanical linkage yields a positive transmission of the flow rate information to the external sensor.

Representative examples of such previous designs are found in U.S. Pat. Nos. 3,116,639 (Bird); 3,946,608 (Herzl); and 4,033,189 (Herzl et al). Each of these examples, however, incorporates a feature which adversely affects the ability of the body and its associated mechanical linkage to transmit information signals, induced by the influences of the vortices, beyond the pipe interior. For example, in Bird, a rubber-like gasket material, used as a fluid seal around the body's rotational shaft, unavoidably exerts considerable friction against the shaft, to reduce its freedom of rotation. This situation decreases the sensitivity of the flowmeter, especially when measuring streams having very low flow rates. In the Herzl and the Herzl et al patents there is a restraint on the freedom of movement of a rotatable body due to the fact that a portion of the body is secured to the interior of the pipe wall. In each of these cases there is a dissipation of the kinetic energy initially produced within the rotatable body by the vortices, so that the amount of motion ultimately transmitted to and detected by the external sensor becomes attenuated. Such attenuation means loss of information and loss of ability to measure very low flow rates.

Therefore, it is an object of the present invention to produce a vortex-sensing flowmeter in which a rotatable body influenced by the vortex street experiences a minimal amount of restraint to rotational motion within the interior of the pipe, to insure maximum transmission of informational signals to a sensor located outside of the pipe.

Another object of the invention is to isolate the sensor away from the process environment, to avoid detrimental influences on the sensors, and to facilitate maintenance thereof.

Still another object is to minimize the susceptibility of the flowmeter to respond to vibrations other than those caused by vortex shedding.

Yet another object of the invention is to achieve a flowmeter assembly which exhibits significant sensitivity to fluid flow even at extremely low flow rates, and to do so in a reliable and accurate manner.

SUMMARY OF THE INVENTION

A vortex flowmeter in accordance with a preferred embodiment of the present invention includes a conduit for carrying a fluid stream, and a vortex shedding body suspended within the conduit with its top and bottom ends spaced apart from the adjacent walls of said conduit, and oriented transverse to the direction of flow. The body is freely rotatably mounted to the walls of the conduit by an attached shaft, with a portion of the shaft extending longitudinally from at least one of the body ends and protruding through the conduit to the exterior. The vortex-shedding body further includes integral downstream side surfaces which are influenced by the periodically shed fluid vortices, thereby tending to produce periodic rotary oscillations of the body and the attached shaft. There is also a relatively thin tube surrounding a portion of the shaft, tightly attached at one end to the shaft and at the opposite end to the conduit. The tube is thick enough to form a seal to prevent passage of fluid past the shaft to the exterior of the conduit, yet it is thin and flexible enough to exert negligible restraining forces on the rotation of the shaft.

The flowmeter further includes a sensing device which is coupled to the external portion of the shaft. The sensing device includes both a mechanism, external to the conduit, for restricting the maximum extent of rotary oscillations of the shaft so as to exert negligible torque on the tube, and a section which is responsive to these restricted rotary oscillations to generate an output signal indicative of the flow rate of the fluid stream.

Due to the freely rotatable nature of the vortex-shedding body and the attached shaft relative to the conduit, the rotary oscillations produced in the body by the periodic influences of the vortices are transmitted to the sensing device, along the body and the rotational shaft, with minimal attenuation. In other words, the majority of the information-bearing signal induced within the vortex-shedding body reaches the sensing device for detection and is not dissipated as losses within either the conduit or the vortex-shedding body mounting structure.

Furthermore, since the signal is rotary, or torsional, in nature, it is minimally influenced by extraneous vibrations affecting the flowmeter, which vibrations are typically linear.

In accordance with another aspect of the invention the flowmeter is housed within a relatively short pipe section, to facilitate installation into a pipeline. The downstream end of the vortex shedding body, when in its normal operating position, protrudes beyond the mounting surface on the downstream end of the pipe section. Ordinarily, this protruding end would interfere with the ease of installation of the flowmeter. However, the sealing tube can be temporarily uncoupled from the conduit to permit the body to be swung into a position perpendicular to its normal operating position. This maneuver retracts the protruding end completely within the confines of the pipe section.

BRIEF DESCRIPTION OF THE DRAWINGS

The novel features and advantages of the present invention will become apparent to those skilled in the art from the following description of the preferred embodiment, in conjunction with the accompanying drawings in which.

DESCRIPTION OF THE PREFERRED EMBODIMENT

Figure 1:
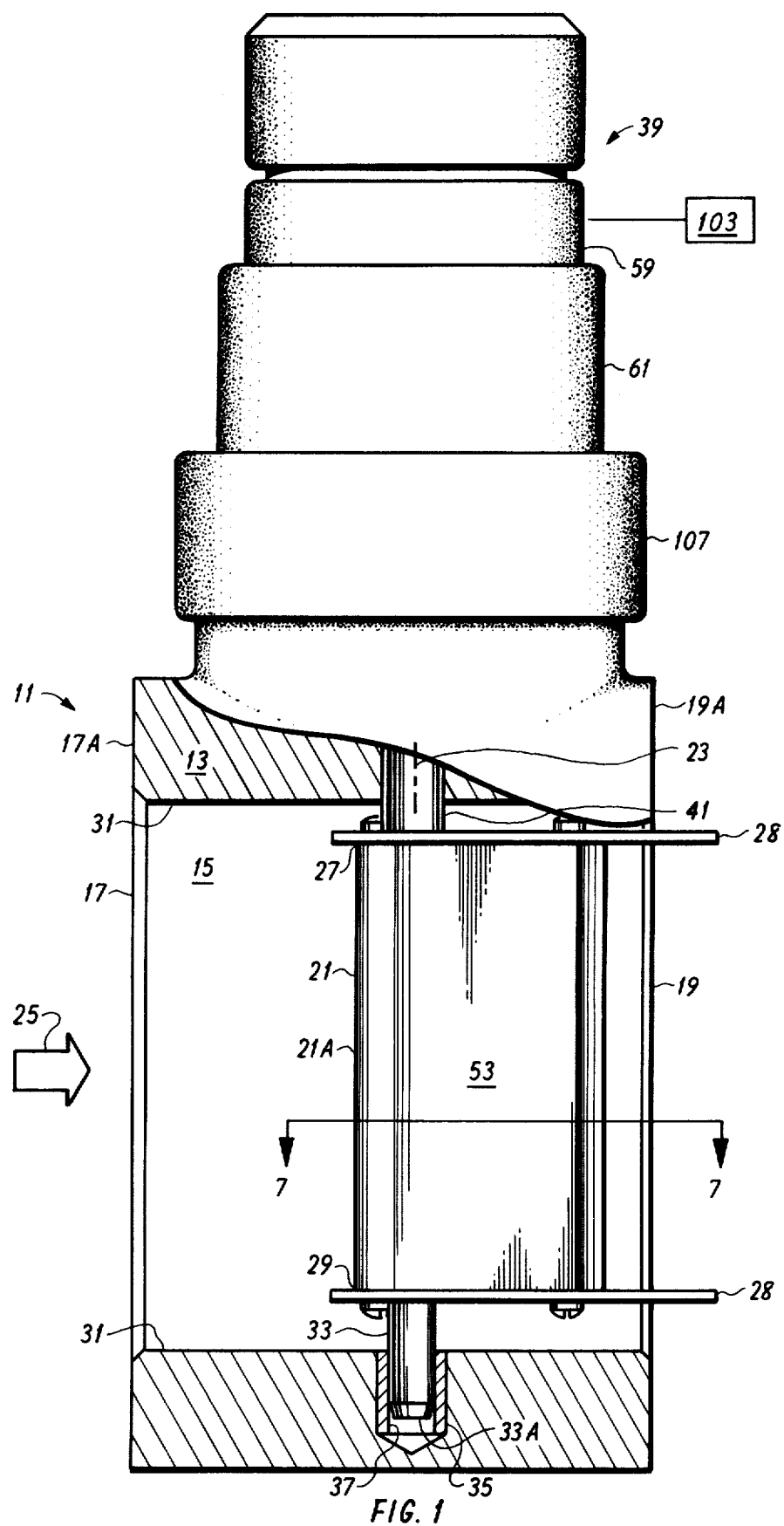
FIG. 1 is a front elevation view, in cutaway and partial section, showing a flowmeter in accordance with the present invention.

As shown in FIG. 1, a flowmeter assembly 11 has an outer housing in the form of a short section of pipe 13, with an inner bore 15, for insertion in a pipeline (not shown) of flowing fluid. The opposite ends 17, 19 of the pipe section 13 have vertical faces 17a, 19a respectively, adapted to butt against a conventionally known gasket assembly (not shown) on the mating sections of the pipeline. Alternate mounting arrangements, such as appropriately configured flanges, can be used to accommodate a particular installation.

A rotatable vortex-shedding body 21 is positioned inside the bore 15 of the pipe 13, with its longitudinal axis 23 oriented generally transverse to the direction of fluid flow within the pipe, indicated by an arrow 25. As can be seen, both a top end 27 and a bottom end 29 of the vortex-shedding body are spaced away from the inner wall 31 of the pipe 13 so that the body is neither attached to nor in frictional contact with this inner wall 31. A pair of shielding plates 28, oriented in the direction of fluid flow, are attached to these opposite ends 27, 29. A rotational shaft 33 is secured internally to the vortex-shedding body and extends beyond both ends 27, 29 of the body 21, into the pipe inner wall 31. Thus, the shaft and the attached vortex-shedding body are adapted for rotation as a unit about the axis 23.

In the embodiment shown, the lower end 33a of the shaft 33 rests within the socket 35 having a shaft-contacting inner surface 37 (see also FIG. 2) made of a friction-reducing material, to provide minimal frictional restraint against rotation of the shaft. Since the socket as shown does not pass completely through the pipe 13, no separate fluid-sealing mechanism is needed about the shaft at this location, which otherwise would restrict shaft movement. Alternatively, any one of a number of conventionally known bearing or flexure assemblies with very low friction characteristics may be substituted for the socket. The primary criterion in the selection of a suitable rotative mounting for the shaft 33 is that the mounting allow maximum freedom of rotation of the shaft, both initially and after exposure to the process fluid.

The upper end of the shaft passes entirely through the wall of the pipe 13 to the exterior thereof, at which point it couples to a sensing mechanism 39 whose operation will be described hereinafter in more detail.

Figure 2:
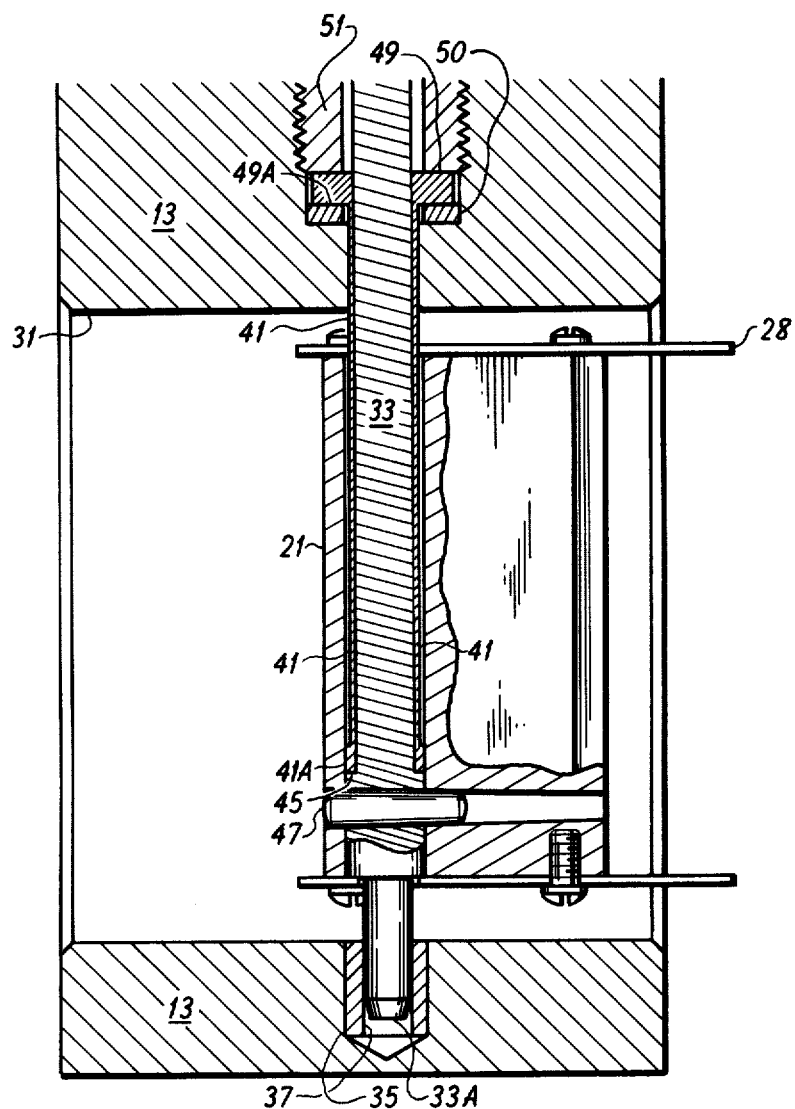
FIG. 2 is a detail view of the flowmeter, in vertical section, showing the vortex-shedding body and its mounting structure.

The upper end of the shaft is rotatably mounted to the pipe 13 in a manner different from the arrangement used for mounting its bottom end 33a. Referring now to FIG. 2, a thin, torsionally flexible sleeve-like tube 41 surrounds the shaft 33 along an intermediate portion of the shaft's length. The tube 41 is made, for example, from a highly tractable metal such as stainless steel or an elastomeric material, to allow it to be twisted without generating an appreciable amount of counter-rotational force. As shown in the illustrated embodiment, a bottom portion 41a of the tube 41 is firmly attached to an outer surface of the shaft 33 at a point within the interior of the vortex-shedding body 21. A recess 45, cut into the outer surface of the shaft, receives the thin tube 41 and aids in the proper positioning and seating of the tube. The tube 41 is fixed to the shaft using any conventionally known technique, such as welding, brazing, adhesives or other suitable processes. A pin 47 passes through the vortex-shedding body into the shaft 33 to rigidly lock the body to the shaft, and cause them to rotate as a single unit. However, any other suitable arrangement for rigidly joining these two members can be utilized.

The upper end of the thin tube 41 has a horizontally disposed flange 49 integrally formed therewith. The underside surface 49a of the flange 49 is seated upon soft-metal gasket 50. A threaded insert 51, engaged within a threaded hole 52, exerts downward pressure on the flange, forcing it against the gasket, so as to achieve a fluid-tight seal. This seal prevents fluid within the pipe section 13 from travelling along the outer surface of the tube 41, past the shaft 33 and into contact with the sensing mechanism 39 (see FIG. 1).

The flexible tube 41 exerts a negligible amount of torsional restraining force against the shaft as the shaft attempts to rotate. Although it is intended that the tube 41 be as thin as possible, to enhance its flexibility and reduce its resistance to torsion, it still must be able to withstand the hydrostatic pressures normally present within the pipe without rupturing. Therefore, depending on the material used, there is a minimum practical thickness which must be maintained in order to withstand the fluid pressures generated by a particular process flow. This situation implies an unavoidable amount of inherent resistance to torsion. However, by proper selection of materials and dimensions of both the shaft 33 and the tube 41, the rigidity of the shaft which links the movements of the rotatable body 21 to the region outside the pipe 13 is made appreciably greater than that of the tube. This means that the small, unavoidable amount of torsional restraining force in the tube is indeed negligible by comparison, and does not perceptibly affect the ability of the shaft to rotate. The tube thickness can be reduced further by having the tube fit snugly around the underlying shaft, thus using the added support of the shaft surface to resist the process fluid pressure.

The entire structure described to this point minimizes the shunting of information-bearing energy induced within the vortex-shedding body into either the pipe wall or the mountings upon which the shaft 33 rotates, where it would be dissipated as heat and lost. In this way, the maximum possible amount of energy is transferred from the body 21 through the shaft 33, to the external sensing mechanism 39, where it is sensed and processed to provide a readout of fluid flow rates within the pipe. In the cases where very low flow rates are being measured or where fluids of very low density are involved, there is, understandably, a minimal amount of energy available for transfer into the rotatable body. Therefore losses suffered during transmission to the outside sensing mechanism 39 could adversely affect the low-flow measuring capability, e.g., if the remaining signal level is insufficient to drive the sensing mechanism. As will be described in more detail later in the specification, although the sensing mechanism does not permit the vortex-shedding body and its firmly attached shaft to actually rotate to any appreciable extent, nevertheless the body and shaft are capable of essentially unrestrained rotation within the pipe itself, to maximize the strength of the flow rate information-bearing signal available for detection by the sensing mechanism.

It also should be pointed out that it is advantageous that the information-bearing signal is conveyed to the sensing mechanism by rotation of the shaft 33 rather than by translational movements. This is because noise signals generally manifest themselves as linear, translational type movements, due to linear acceleration from shocks or stresses acting upon the exterior of the pipe. Using a sensing mechanism which responds only to rotary movements and effectively ignores any non-rotary movements avoids the serious problem of weak information signals being obscured by noise.

To reduce the likelihood of spurious rotations being induced in the vortex-shedding body 21 by external forces exerted on the flowmeter assembly 11, the rotational shaft 33 in the illustrated embodiment (see FIGS. 1 and 2) is located at the center of mass of the body 21, that is, at the point where the total mass of the body, including that of the end plates 28, is symmetrically distributed about the shaft. In this way, accelerations due to external forces are applied simultaneously to equal masses on either side of the shaft. Since the applied force equals the mass times the acceleration, the forces on one side of the shaft, which otherwise would tend to rotate the body about the shaft, are counterbalanced by equal forces on the opposite side of the shaft, leaving a zero net rotative force. Although the shaft is preferably positioned at the center of mass of the vortex-shedding body itself, any conventional system of counterbalancing weights may be attached to the shaft to achieve the above-described symmetry of mass about the shaft. Such a counterbalancing system even may be attached conveniently to that portion of the shaft which protrudes outside of the pipe 13.

At this point in time it may be helpful to discuss how the desired rotary oscillations are induced in the vortex-shedding body 21. Referring again to FIG. 1, the contours of the body 21 are specifically configured so that an upstream-facing portion 21a of the body, which is integrally formed therewith, presents a non-streamlined profile to the incoming fluid stream and is able to shed an alternating series of vortices within the fluid stream, first from one side of the body and then from the other, in a manner well known in the vortex flowmeter art. A detailed description of a specific body contour, suitable for vortex shedding, is contained in U.S. Pat. No. 4,088,020, having the same assignee as the present application, and which hereby is incorporated by reference.

The vortices are shed at a frequency proportional to the flow rate of the fluid stream. As the vortices proceed in the direction of the arrow 25, past the downstream portion of the vortex-shedding body, they exert influence alternately on a front and a back lateral surface 53, 54 (see FIG. 7) respectively, of the body. When the vortex action produces pressure on the front lateral surface 53 of the vortex-shedding body 21, the body tends to rotate rearward, into the plane of the drawing. Shortly thereafter, when the vortex action produces a similar pressure on the back lateral surface 54 of the body, the body tends to rotate the body forward, opposite to the prior influence of the vortices. As the stream of vortices continues past the rotatable body and exerts pressure on alternate sides thereof, a tendency is created to rotate or oscillate the vortex-shedding body and the attached shaft 33 in alternate directions about the rotational axis 23. The frequency at which this tendency to oscillate occurs is the same as the rate at which the vortices are shed, and, as described above, depends on the flow rate of the fluid through the pipe.

Figure 7:
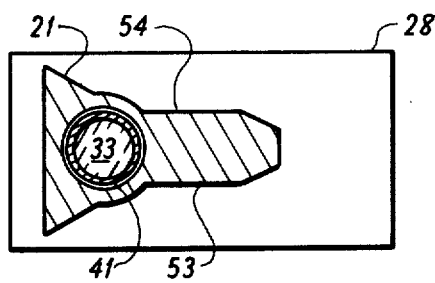
FIG. 7 is a detail sectional view of the vortex-shedding body, taken along line 7—7 of FIG. 1.

Maximum interaction with and maximum energy transfer to the lateral sides of the vortex-shedding body occur when each vortex is shed in a single, in-phase "sheet" extending across the full height, or span, of the body, i.e. from its top end 27 to its bottom end 29. In previous vortex flowmeter designs, wherein the top and bottom ends of the body are butted against and secured to the inside of the pipe wall, the presence of the wall prevents the creation of destructive turbulence or "three-dimensional end effects", which can be caused by fluid flow through a gap between the ends of the vortex-shedding body and the pipe wall. These three-dimensional effects result in out-of-phase, nonperiodic vortices which are detrimental to providing accurate flow rate information. Since the top and bottom ends 27, 29 of the vortex-shedding body 21 in the present invention are intentionally spaced from the inner wall 31 of the pipe 13, to improve the rotatability thereof, the horizontally extending shielding plates 28 (see FIGS. 1 and 7) serve as functional substitutes for the wall, to prevent these undesirable effects. As shown in FIGS. 1 and 7, these plates are relatively thin and are generally rectangular in shape, although other appropriate shapes and configurations are possible. The edges of the plates 28 extend, on all sides, beyond the periphery of the body, to a sufficient distance to prevent fluid cross-flow in the regions between the body ends and the pipe wall. In the illustrated embodiment these plates extend beyond the body in the downstream direction to a further degree than in the other directions. As far as the effective shedding of vortices is concerned, the shielding plates 28 perform the same function as would the wall of the pipe.

Due to the previously discussed freely rotatable nature of both the vortex-shedding body 21 and the rotational shaft 33, and the negligible restraining force of the tube 41 the pressures exerted by the vortices potentially can create a sizable rotation of the body, in the absence of any externally imposed restraint. However, the body and its attached shaft are never actually permitted to experience such free-wheeling rotations. The important consideration is that the more freely the body is able to rotate within the pipe, the easier it can be set in motion by even the relatively weak vortices generated by slow-moving fluids. Once this periodic, vortex-induced motion, incorporating the flow rate information, has been transmitted with minimal attenuation via the shaft 33 to the exterior of the pipe, it can be sensed by any of a variety of conventional detectors to transform this vibratory motion into an output signal indicative of the flow rate. However, unrestrained rotation of the shaft will unduly strain and fatigue the tube 41, leading to premature failure of the fluid-tight seal. Therefore it is desirable to use a sensing mechanism which couples to the external portion of the shaft and applies a restraining force thereto, to limit severely the actual rotative travel of the shaft.

Figures 3, 4:
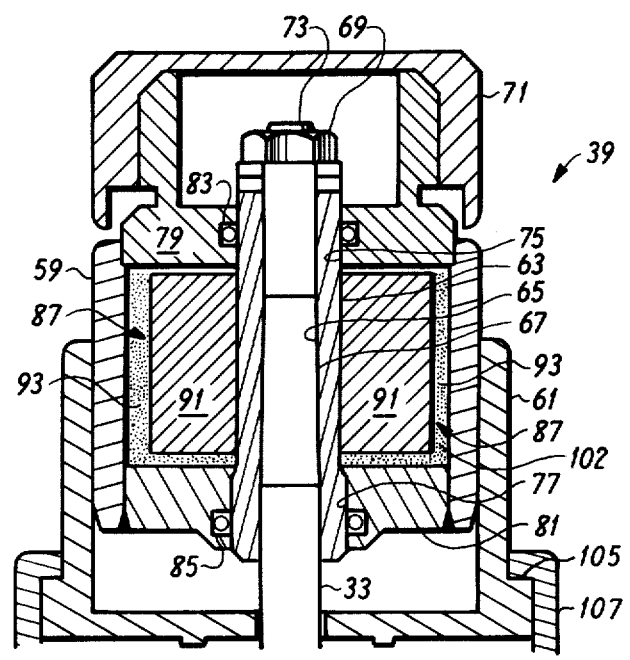
FIG. 3 is a detail view, in vertical section, of the external sensor and its interconnection with the rotational shaft of the vortex-shedding body.
FIG. 4 is a detail view, in horizontal section, of the external sensor.

Referring now to FIG. 3, such a specially configured sensing mechanism 39 is contained within a rugged housing 59 which sits securely in a mating receptacle 61 mounted to the exterior of the pipe 13. The mechanism 39 is shown as an integral, self-contained unit, which can be uncoupled easily from the shaft 33 and replaced as needed, without disturbing the fluid flow within the pipe, and which is isolated from the deteriorating effects of the fluid as well. A central cylindrical hub 63 with an upwardly tapered internal cavity 65 snugly accommodates a similarly tapering end portion 67 of the shaft 33. A nut 69, accessible by removing a cover 71, engages a threaded section 73 of the shaft 67, and applies downward pressure on the hub 63, keeping it in a tight, non-slipping engagement with the shaft portion 67. This arrangement insures rotation of the hub with the shaft as a unit. The hub 63 itself is rotatably cradled in bearing surfaces 75, 77 formed in upper and lower supports 79, 81 respectively, which supports are attached rigidly to the housing. Upper and lower O-rings 83, 85 surround the hub to form a seal against intrusion by external moisture.

Referring now to FIGS. 3 and 4, four radially extending rotor arm assemblies 87 are firmly attached to the hub 63, each positioned at equal 90° intervals about the hub circumference. Although the illustrated embodiment shows four such assemblies, configurations using different numbers are equally feasible. Each rotor assembly 87 includes a base 89, with generally rectangular vertical surfaces 90, which extends vertically along a section of the hub 63 with its longitudinal axis parallel to that of the shaft 33. Rectangular metal plates 91 are mounted parallel to one another on opposite vertical surfaces of each base 89, the plates being of the same approximate size as the vertical surfaces 90.

The four rotor assemblies 87 are positioned respectively within four vertically extending cavities 93 formed in the housing 59 (see also FIG. 4), between the upper and lower supports 79, 81 (see FIG. 3). Metal plates 97 are fastened to the vertical wall which define the respective cavities 93, each plate being disposed opposite, and spaced away from, the corresponding plate 91 in the corresponding rotor arm assembly 87. The voids 101 between the stationary plates 97 and the plates 91 on the movable rotor arm assemblies 87 are filled with a resilient dielectric material 102, which allows only limited variations in the spacing between the opposing plates, despite the magnitude of the torque developed by the shaft. Preferably this resilient material has a suitable spring characteristic such that the typically small amounts of torque generated by the vortices associated with a very slow moving fluid stream can produce a noticeable rotation of the shaft and therefore a noticeable change in the inter-plate spacing, while the considerably greater amounts of torque associated with rapidly moving fluids do not result in excessive rotations. For example, a material having a non-linear spring characteristic may be used advantageously. As mentioned above briefly, such restraint on the shaft rotation avoids fatigue of the sealing tube 41.

Each combination of a stationary plate 97, its corresponding movable plate 91, and the intervening dielectric material 102 effectively forms a variable capacitor, and the above discussed changes in inter-plate spacing result in changes in the capacitance thereof. Clearly, the capacitance varies periodically, due to the periodic movements of the shaft under the influence of the vortices. Each of the capacitors is joined, via a suitable interconnection scheme (not shown) to a conventional electronic circuit 103, shown diagrammatically in FIG. 1, which is able to respond to the periodic changes in capacitance and convert them into an output signal indicative of the fluid flow rate. The specific details of a circuit to provide such a function would be apparent to one skilled in the electronics art and therefore are not recited here.

Although this sensor operates on the principle of detecting a periodically changing capacitance value, other equally acceptable detecting schemes are conceivable. For example, a piezoelectric crystal can be inserted within the resilient dielectric material, to produce periodic electrical impulses as the crystal is mechanically stressed. Alternatively, a suitably positioned optical sensor can be used to detect visually the movements of the rotor assemblies and produce an appropriate output signal.

It should be noted that since, in order to measure the flow rate, it is only necessary to detect the frequency, rather than the amplitude, of the deflection, the frequency output signal produced is peculiarly adaptable to a digital system. There is no need for providing an analog to digital conversion of the output signal.

Figure 5A:
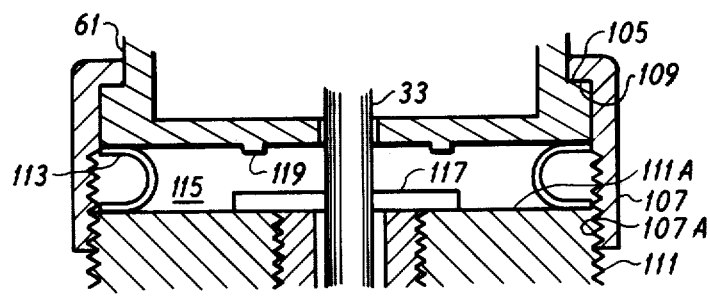
FIGS. 5A and 5B are detail views of the rotational shaft clamping mechanism in non-actuated and actuated conditions respectively.

Since the sensing mechanism 39 represents the only structure in the flowmeter which intentionally exercises appreciable restraint against the rotation of the shaft, a problem arises if it becomes necessary to disconnect the sensing mechanism for replacement or repair. If the flow of fluid through the pipe is not to be interrupted during such an operation, the vortices may cause the freely rotatable vortex-shedding body to be rotated excessively, thus unnecessarily stressing the sealing tube 41. Therefore, to prevent such potentially destructive action, an adjustable shaft clamping mechanism is provided in the present invention. Referring now to FIGS. 3 and 5A, the cup-like receptacle 61 used for retaining the sensing mechanism has an outwardly projecting rim 105 extending about its circumference. A coupling rim 107 has an inwardly projecting lip 109 which bears against this rim. The inner wall 107a of the coupling ring threadedly engages a threaded boss 111 on the exterior of the pipe 13. A series of C-shaped springs 113 are secured at their top edges to the underside of the receptacle 61 and at their bottom edges to the top of the boss 111. The springs 113 are spaced evenly about the inner circumference of the coupling ring 107 and they exert an upward bias on the receptacle 61 to maintain a passage 115 between the receptacle and the top of the boss 111. Rotating the threaded coupling ring 107 varies the compression of the springs 113 and changes the height of this passage 115.

Figure 5B:
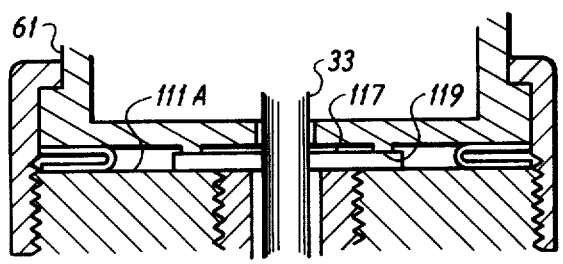

The passage accommodates a disk 117 integrally formed with the shaft 33 and extending radially outwardly therefrom. During normal operation of the flowmeter this disk 117 is free to rotate along with the shaft within the passage 115. However, when it becomes necessary to disconnect the external sensing mechanism 39 from the shaft portion 67, the coupling ring 107 is rotated in the appropriate direction to draw the receptacle 61 downward, compressing the springs 113, until the disk 117 becomes squeezed between the top surface 111a of the boss and an annular protrusion 119 depending from the underside of the receptacle (see FIG. 5B). This arrangement prevents any rotation of the shaft despite the influences of the vortices on the vortex-shedding body 21. Upon replacement of the external sensing mechanism 39, the coupling ring 107 is rotated in the opposite direction to allow the receptacle 61 to move upwardly, under the influence of the springs 113, until the disk 117 again is free to move.

As mentioned previously in the specification, the embodiment shown utilizes a relatively short section of pipe 13 as an outer housing. This facilitates the insertion of the flowmeter into a pipeline as well as making it a suitable replacement for other narrow profile flowmeters. However, this advantage is lost if the vortex-shedding body 21 or other components attached thereto protrude beyond the end of the housing. For example, in FIG. 2, the shielding plates 28 are shown as extending outside of the pipe 13. However, the width of the body 21, that is, its dimension transverse both to the direction of fluid flow and its longitudinal axis 23, is generally shorter than its length, i.e., in the direction of fluid flow. The freely rotatable nature of the body once the threaded insert 51 (see FIG. 2) has been backed off, allows it, for installation purposes, to be rotated until its narrower width portion is aligned in the direction of the fluid flow, and no portion of the rotatable body protrudes beyond the confines of the housing. Naturally this rotation involves the disconnection of the sensing mechanism 39 from the upper portion 67 of the shaft, and the actuation of the above described shaft clamping mechanism, to maintain the body in the installation position. Once the flowmeter assembly has been properly installed with its pipeline, the shaft is freed, the vortex-shedding body is returned manually to its normal working position, and the sensing mechanism is connected to the shaft. Appropriate indicia can be provided on the shaft and housing to indicate the relative position of the rotatable body with respect to the flow direction, to insure the proper alignment of the rotatable body at the start of normal operation.

Figure 6:
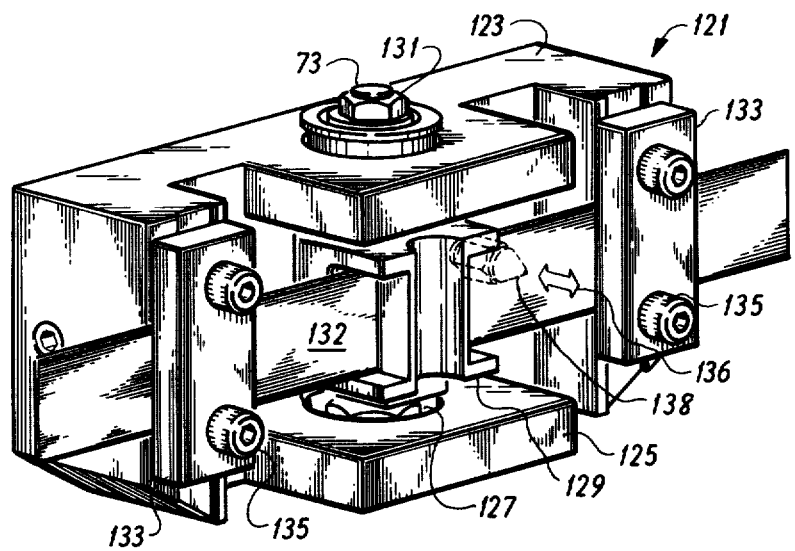
FIG. 6 is a perspective view of an alternate sensor mechanism.

Referring to FIG. 6, there is shown an alternate external sensor 121 which is particularly useful in a flowmeter in accordance with the present invention. As in the case of the previously shown sensor 30, the sensor 121 can be uncoupled from the flowmeter without requiring a disruption in the process fluid flow. A housing 123 has a lower horizontal mounting plate 125 for securing the sensor to the pipe 13 (see FIG. 1). The shaft 33 passes upwardly through an access hole 127 in the plate 125 through a rotary junction block 129, through an access hole in the top surface of the housing 123, and terminates at the nut 131 which tightly engages the threaded top portion 73 of the shaft. A set screw (not shown) at the rear of the rotary junction block clamps the block securely to the shaft, and forces the block to oscillate in unison with the shaft.

In the illustrated embodiment a stainless steel band 132 is adjustably fastened at either end to the housing 123 by means of clamps 133, held in place by screws 135. The band passes through, and is coupled firmly to, the junction block 129, so that the oscillations of the junction block periodically vary the tension applied to the band. Clearly as the block rotates clockwise (as viewed from above) so as to increase the tension on the right-hand portion of the band, it simultaneously decreases the tension on the left-hand portion. The opposite condition holds true when the block changes direction and rotates counterclockwise.

Proper adjustment of the initial tension of the band while the junction block 129 is in an at-rest condition assures that the sensor 121 provides the appropriate type of restraint needed for efficient operation of the flowmeter. A slight amount of slack in both the left-hand and right-hand portions of the band allows the junction block to rotate slightly in either direction before sufficient tension is built up in the band to resist any further movement. In this way, the sensor still responds to the minute movements of the shaft occurring at low flow rates, yet, due to the significantly high tensile strength of the band, it sets a limit on the maximum amount of movement possible even at much higher flow rates.

As the righthand left-hand portions of the band alternately are tensioned and loosened, their planar surfaces deflect back and forth periodically, in the directions indicated by an arrow 136. The rate of movement of the shaft, which is determined by the flow rate within the pipe, is sensed by detecting the periodic deflections of the band. In the embodiment shown, a nozzle 138 is positioned a slight distance behind the band, to form a conventional flapper-nozzle arrangement. When a supply of air (not shown) is supplied to the nozzle, movement of the band toward the nozzle causes an increase in the nozzle pressure, while movement away correspondingly decreases the pressure. Periodic movements of the band, even on the order of thousandths of an inch, produce a periodic pneumatic signal representative of the flow rate. Alternatively, the band deflection can be detected using, for example, magnetic or optical pick-up devices.

It should be pointed out that the present flowmeter may be adapted to measure mass flow as well. While the rate of rotary motion of the shaft 33 is proportional to the velocity V of the fluid stream, the fluid simultaneously also exerts an additional force on the rotatable body-shaft combination, in the direction of the fluid flow, which is proportional to $\rho v^2$, $\rho$ being the fluid density. Conventionally known transducers could be used to measure the $\rho v^2$ force. Performing the calculation $(\rho v2/v) = \rho v$ yields the mass flow rate of the fluid.

Although the present invention has been described in terms of the preferred embodiment shown in the accompanying figures, certain modifications and changes may become apparent to those skilled in the art. For example: alternative bearing surfaces to insure freedom of rotation of the shaft with respect to the pipe wall may become evident; alternative sensing mechanisms may be used to respond to the limited rotations of the shaft. It is intended that such modifications be included within the scope of the following claims.

What is claimed is:

1. Apparatus for measuring the flow rate of a fluid stream, comprising in combination:
   a conduit for carrying said fluid stream;
   an elongate vortex-shedding body in said conduit and positioned with its longitudinal axis transverse to the direction of fluid flow to shed vortices alternately from opposite sides thereof, to apply an alternating torque to said body about said longitudinal axis;
   support shaft means secured to said body and aligned with said longitudinal axis, said support shaft means being rotatably mounted to said conduit for rotation about said axis, and having one end extending out through an opening in said conduit, beyond the wall thereof;
   a relatively thin flexible tube surrounding a portion of said support shaft means adjacent said one end and coaxial therewith, the outer end of said tube being sealingly secured to the wall of said conduit, and the inner end of said tube being sealingly secured to said support shaft means, to prevent fluid leakage through said opening; and
   sensing means external to said conduit and coupled to said support shaft means, for developing a signal representative of the flow rate of said fluid stream.

2. Apparatus as set forth in claim 1 wherein the ends of said vortex-shedding body are physically detached from said conduit, and is held in position within said conduit by said support shaft means.

3. Apparatus as set forth in claim 1 wherein said tube is made of stainless steel.

4. Apparatus as set forth in claim 1 wherein said tube is made of an elastomeric material.

5. Apparatus as set forth in claim 2 further comprising:
   means for preventing three-dimensional effects in the regions between the ends of said body and the walls of said conduit.

6. Apparatus as set forth in claim 5 wherein said preventing means comprises:
   a pair of parallel plates attached to the opposite ends of said body and extending beyond the outer periphery thereof.

7. Apparatus as set forth in claim 1, wherein said external sensing means comprises
   means for restricting rotational motion of said shaft means in response to said alternating torque, and
   means responsive to said restricted rotational motion for developing a signal reflecting the flow rate of said fluid.

8. Apparatus as set forth in claim 1, wherein said sensing means comprises:
   a housing fixed relative to said conduit;
   a central hub within said housing adapted for rigid attachment to, and movement with, said end of said support shaft means;
   a plurality of rotors rigidly attached to, and radially outwardly extending from, said hub, and spaced apart from said housing;
   a resilient material filling the spaces between said rotors and said housing, said material restricting the amount of movement of said rotors relative to said housing; and
   means responsive to the restricted movement of said rotors, for developing a signal representative of the flow rate of said fluid stream.

9. Apparatus as set forth in claim 8 wherein said responsive means comprises a piezoelectric crystal disposed within said resilient material, subject to mechanical stresses produced by the movement of said rotors.

10. Apparatus as set forth in claim 8 wherein said responsive means comprises optical means disposed to detect the movement of said rotors.

11. Apparatus as set forth in claim 1, wherein said sensing means comprises:
    a housing fixed relative to said conduit;
    a central hub within said housing adapted for rigid attachment to, and movement with, said end of said support shaft portion;
    a plurality of rotors radially outwardly extending from said hub, and spaced apart from said housing, each of said rotors including
    a base member rigidly attached to said hub, and
    at least one first metallic plate disposed on the outer surfaces of said base member;
    a plurality of second metallic plates fixed with relation to said housing, spaced apart from and disposed relative to said plurality of rotors and said first metallic plates so as to form a plurality of capacitors therewith; and
    a resilient dielectric material filling the spaces between said first metallic plates and said second metallic plates, said material limiting the amount of movement of said rotors relative to said second metallic plates;
    whereby periodic movement of said rotors relative to said second metallic plates, in response to the rotations of said shaft, produces a periodic change of capacitance at a rate corresponding to the flow rate.

12. Apparatus as set forth in claim 1, wherein said sensing means comprises:
    a housing;
    a junction block within said housing, firmly attached to, and movable with, said shaft portion;
    a thin metallic band fastened to said junction block and extending at either end beyond said block, the ends of said band being rigidly attached to said housing, said band having sufficient slack therein to permit limited back-and-forth rotation of said block and the attached shaft portion, until said band becomes taut; and
    means for detecting the periodic movement of said band as it alternately becomes taut and slackens due to the rotations of said shaft.

13. Apparatus as set forth in claim 12, wherein said detecting means comprises
    an air nozzle disposed relative to said moving metallic band so as to form a pneumatic flapper-nozzle combination therewith, whereby said periodic movement of said band produces a corresponding periodic change in air pressure at said nozzle.

14. Apparatus as set forth in claim 12, wherein said detecting means comprises an optical means.

15. Apparatus for measuring the flow rate of a fluid stream, comprising in combination:

a conduit for carrying said fluid stream;

a vortex shedding body, suspended with said conduit, with its top and bottom ends spaced apart from the adjacent walls of said conduit, and oriented transverse to the direction of flow, said body being freely rotatably mounted to said conduit by an attached shaft, a portion of said shaft extending longitudinally from at least one of said ends and protruding through said conduit to the exterior thereof, and said body further including integral downstream side surfaces which are influenced by periodically shed fluid vortices, thereby tending to produce periodic rotary oscillations of said body and the attached shaft;

a relatively thin tube surrounding said shaft portion, being tightly attached at one end to said shaft and being adapted at the opposite end to be tightly secured to said conduit, said tube being thick enough to form a seal to prevent passage of fluid past said shaft to the exterior of said conduit, yet thin and flexible enough to exert negligible restraining forces on the rotation of said shaft; and sensing means external to said conduit and coupled to said shaft portion, including means for restricting the maximum extent of said rotary oscillations of said shaft, whereby negligible torque is exerted on said tube, and means responsive to said restricted rotary oscillations for generating an output signal indicative of the flow rate of said fluid stream;

whereby the rotary oscillations produced in said body by the periodic influences of the vortices are transmitted to said sensing means along said body and said shaft with minimal attenuation, due to the freely rotatable nature of said body and said shaft relative to said conduit.

16. Apparatus as set forth in claim 15, further including selectable, externally actuable means for preventing rotation of said shaft when uncoupling said sensing means from said shaft portion.

17. Apparatus as set forth in claim 15, wherein said tube is adapted to be tightly secured to said shaft by an adjustable, releasable coupling means which presses a portion of said opposite end of said tube into sealing engagement with said conduit.

18. Apparatus for measuring the flow rate of a fluid stream, comprising in combination:

a conduit for carrying said fluid stream;

a vortex shedding body, suspended within said conduit, with its top and bottom ends spaced apart from the adjacent walls of said conduit, and oriented transverse to the direction of flow, said body being freely rotatably mounted to said conduit by an attached shaft, a portion of said shaft extending longitudinally from at least one of said ends and protruding through said conduit to the exterior thereof, and said body further including integral downstream side surfaces which are influenced by periodically shed fluid vortices thereby tending to produce periodic rotary oscillations of said body and the attached shaft;

a pair of parallel plates attached to the opposite ends of said body and extending beyond the outer periphery thereof, so as to prevent passage of fluid in the regions between the ends of said body and the walls of said conduit;

a relatively thin tube surrounding said shaft portion, being tightly attached at one end to said shaft and being adapted at the opposite end to be tightly secured to said conduit, said tube being thick enough to form a seal to prevent passage of fluid past said shaft to the exterior of said conduit, yet thin and flexible enough to exert negligible restraining forces on the rotation of said shaft; and external sensing means coupled to said shaft portion, including a housing, a junction block within said housing, firmly attached to and movable with said shaft portion, a thin metallic band fastened to said junction block and extending at either end beyond said block, the ends of said band being rigidly attached to said housing, said band having sufficient slack therein to permit limited back-and-forth rotation of said block and the attached shaft portion until said band becomes taut, and an air nozzle disposed relative to said moving metallic band so as to form a pneumatic flapper-nozzle combination therewith, whereby said periodic movement of said band produces a corresponding periodic change in air pressure at said nozzle, means responsive to said periodic changes in pressure for generating an output signal indicative of the flow rate of said fluid stream;

whereby the rotary oscillations produced in said body by the periodic influences of the vortices are transmitted to said sensing means along said body and said shaft with minimal attenuation, due to the freely rotatable nature of said body and said shaft relative to said conduit.

* * * * *